Jan. 13, 1925.
R. W. MILLER
1,522,643
TIRE CHAIN
Filed Oct. 15, 1923
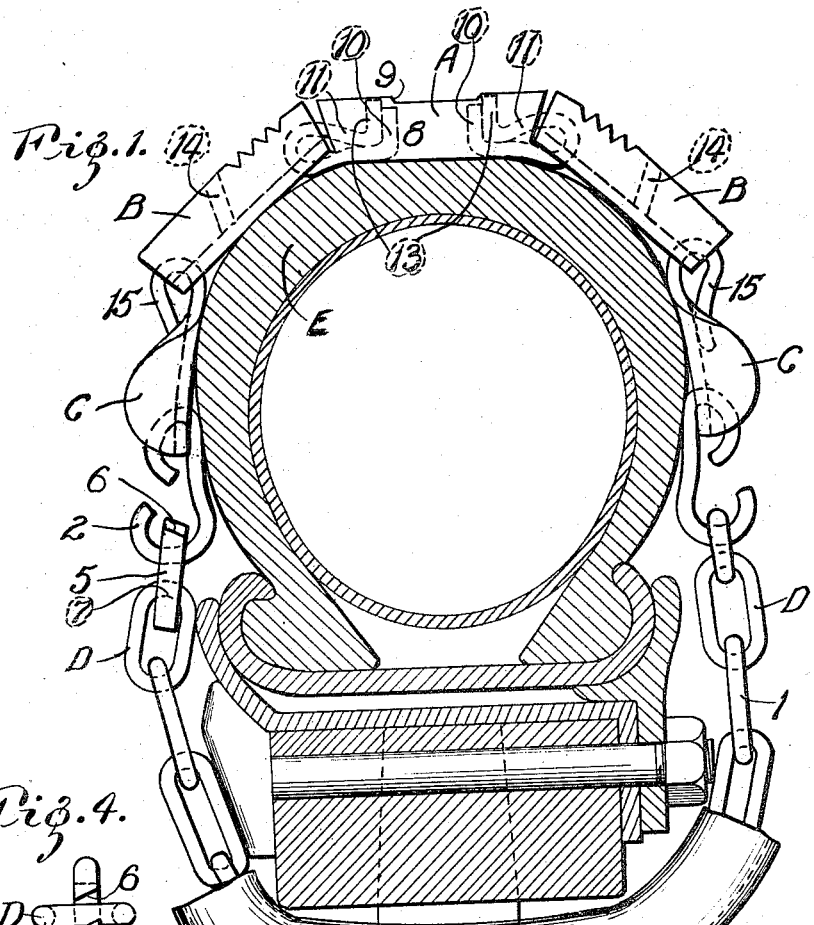
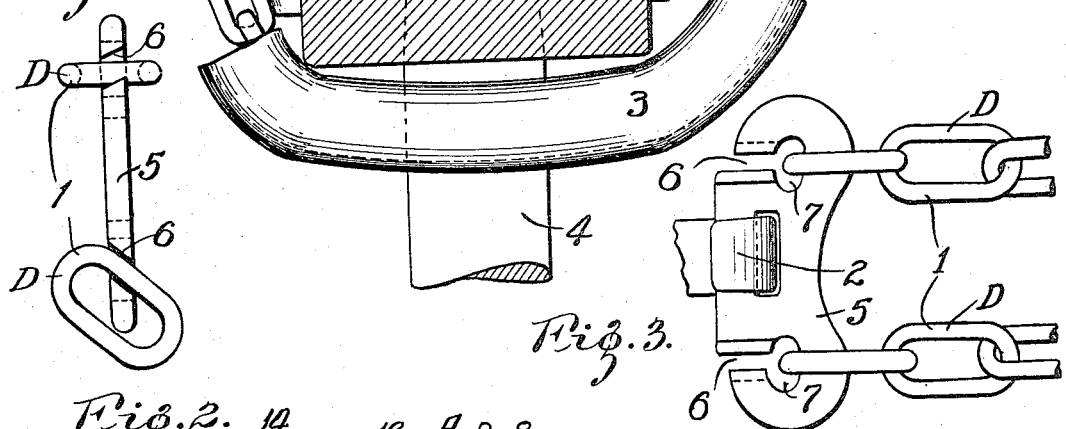
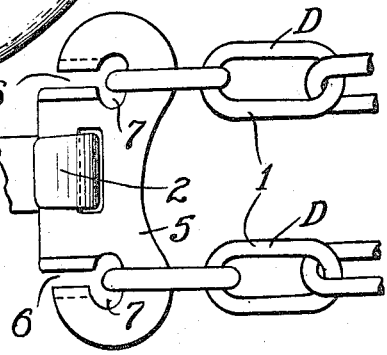
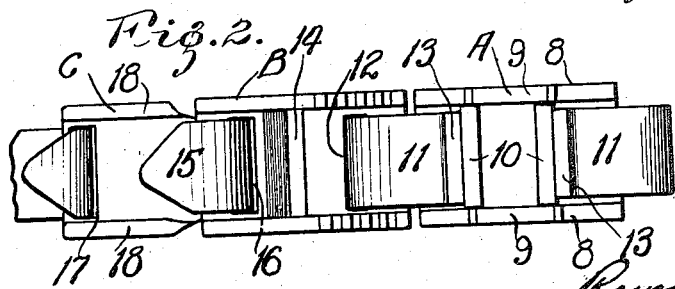
Inventor:
Reynold W. Miller,
by his Attorneys.

Patented Jan. 13, 1925.

1,522,643

UNITED STATES PATENT OFFICE.

REYNOLD W. MILLER, OF HIGHLAND, ILLINOIS.

TIRE CHAIN.

Application filed October 15, 1923. Serial No. 668,590.

*To all whom it may concern:*

Be it known that I, REYNOLD W. MILLER, a citizen of the United States, and a resident of the city of Highland, county of Madison, and State of Illinois, have invented a certain new and useful Improvement in Tire Chains, of which the following is a specification.

My invention relates to tire chains for automobiles and other vehicles; and it has for its principal object a chain that will prevent slipping and skidding, that can be easily attached, and that will be capable of long use.

The invention consists principally in the chain and in the parts and combinations of parts hereinafter described and claimed.

In the accompanying drawing,

Fig. 1 is a sectional view of an automobile tire and rim showing a chain embodying my invention in position thereon, Fig. 2 is a partial plan view of a chain showing particularly the middle link thereof.

Fig. 3 is a fragmentary view showing the attaching plate whereby the ends of the chain are secured together, and Fig. 4 is another view of said attaching plate showing the method of securing the links of the chain thereto.

The tire chain comprises a middle or tread link A, auxiliary tread links B secured to the ends of said middle link, filler links C secured to said auxiliary links, and a securing chain D for holding the tread chain in place on the tire E. Preferably the securing chain has two branches 1 that are secured to a suitable hooked member 2 at one end of the tread chain. The branches of the chain may be provided with covers 3 of leather or other suitable material.

The branches 1 of the securing chain D straddle a spoke 4 of the vehicle wheel and are attached to a plate 5 that is secured to a hooked member 2 at the other end of the tread chain. Preferably said plate has inclined notches 6 therein that communicate with recesses 7; so that the end links of the branches 1 of the securing chain are attached to the plate 5 by being canted to permit them to enter the inclined slots 6 and then straightened out in the recesses 7. The chain may be easily removed.

The main tread link A has upstanding side walls 8 that have a recessed middle portion 9. Upstanding rib portions 10 are disposed transversely of the link, said ribs being preferably formed by slitting the base 10 of the link. Elongated looped portions 11 project from the ends of the base of the main tread link and are passed through the slots 12 provided therefor in the bases of the auxiliary tread links B and doubled back on themselves. Preferably the ends 13 are bent upwardly to form flanges that rest against the upstanding ribs 10 of the main tread link.

The auxiliary tread links B have upstanding rib members 14 extending transversely thereof, said members being preferably inclined towards the main tread link. Preferably the side walls of the auxiliary tread members are notched adjacent to the ends of the main tread member.

Each filler link C has a looped portion 15 at one end thereof that passes through a transverse slot 16 in the base of the adjacent auxiliary tread link B whereby the two are secured together and has a transverse slot 17 at the other end whereby it may be secured to an adjacent filler link C or to a hook member 2. Preferably the filler links are provided with marginal flanges 18.

The upstanding ribs 10 of the main tread link and the flanged portions 13 enable the vehicle to resist side skidding. The main tread link is ordinarily case-hardened, and when the end portions of the side walls 8 wear down, the lower middle portion 9 will present a hardened surface to take the wear.

The notches in the auxiliary tread links and the upstanding portions thereof resist side skidding. Any desirable number of tread chains may be used; and they may be applied as "mud-grips" in the manner shown in the drawing, or they may be secured to chains extending circumferentially of the wheel.

Obviously, numerous changes may be made without departing from the invention, and I do not wish to be limited to the precise construction shown.

What I claim is:

1. A tire chain link comprising side walls, a base, upstanding transverse ribs and looped portions projecting from the ends of the base whereby the link may be secured to other links, said looped portions being doubled back on the base.

2. A tire chain link comprising side walls, a base, upstanding transverse ribs and looped portions projecting from the ends of the base whereby the link may be secured to other links, said looped portions being doubled back on the base and having flanged ends resting against said upstanding ribs.

3. A tire chain comprising a tread link having upstanding side walls and transverse ribs and looped end portions, auxiliary tread links having upstanding side walls and each having a transverse rib inclined toward said tread link, filler links each having a looped portion at one end and having flanged sides, the bases of said auxiliary links being slotted to accommodate the looped portions of said tread link and said filler links and means for securing said chain on a tire.

4. In combination, a tire chain having a branched securing portion and a securing plate therefor, said plate being attached to said chain and having inclined notches communicating with recesses adapted to accommodate the end links of the branches of said chain.

5. A tire chain comprising a tread link having upstanding side walls and transverse ribs and looped end portions, auxiliary tread links having upstanding side walls and each having a transverse rib inclined toward said tread link, the base of each of said auxiliary tread links being slotted at one end to accommodate a looped portion of said tread link, and means for securing said chain on a tire.

Signed at St. Louis, Mo., this 12th day of October, 1923.

REYNOLD W. MILLER.